United States Patent
Guo et al.

(10) Patent No.: US 9,886,417 B2
(45) Date of Patent: Feb. 6, 2018

(54) METHOD AND APPARATUS FOR CONTROLLING VOLTAGE IN WIND FARM

(71) Applicant: Tsinghua University, Beijing (CN)

(72) Inventors: Qinglai Guo, Beijing (CN); Hongbin Sun, Beijing (CN); Bin Wang, Beijing (CN); Boming Zhang, Beijing (CN); Wenchuan Wu, Beijing (CN); Fengda Xu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 333 days.

(21) Appl. No.: 14/839,949

(22) Filed: Aug. 29, 2015

(65) Prior Publication Data

US 2016/0084225 A1    Mar. 24, 2016

(30) Foreign Application Priority Data

Aug. 29, 2014   (CN) .......................... 2014 1 0437727

(51) Int. Cl.
| | |
|---|---|
| *G06F 17/10* | (2006.01) |
| *G05B 13/04* | (2006.01) |
| *F03D 7/02* | (2006.01) |
| *F03D 7/04* | (2006.01) |

(52) U.S. Cl.
CPC ............. *G06F 17/10* (2013.01); *F03D 7/028* (2013.01); *F03D 7/045* (2013.01); *G05B 13/048* (2013.01); *F05B 2270/404* (2013.01); *Y02E 10/723* (2013.01)

(58) Field of Classification Search
CPC .......... G06F 17/10; F03D 7/045; F03D 7/028; G05B 13/048; F05B 2270/404; Y02E 10/723
See application file for complete search history.

(56) References Cited

U.S. PATENT DOCUMENTS

| | | | |
|---|---|---|---|
| 9,046,077 B2* | 6/2015 | Kirchner | F03D 7/0284 |
| 2007/0055392 A1* | 3/2007 | D'Amato | G05B 13/048 |
| | | | 700/44 |
| 2013/0166084 A1* | 6/2013 | Sedighy | G06Q 50/06 |
| | | | 700/291 |
| 2014/0159367 A1* | 6/2014 | Yin | F03D 7/028 |
| | | | 290/44 |
| 2014/0257666 A1* | 9/2014 | Abrol | F02C 9/48 |
| | | | 701/100 |
| 2015/0219074 A1* | 8/2015 | Babazadeh | F03D 7/048 |
| | | | 290/44 |

* cited by examiner

*Primary Examiner* — Sean Shechtman
*Assistant Examiner* — Tri T Nguyen
(74) *Attorney, Agent, or Firm* — Kile Park Reed & Houtteman LLC

(57) ABSTRACT

The present disclosure relates to a method and an apparatus for controlling a voltage in a wind farm. The method includes: collecting measured values of parameters as initial values of the prediction values; inputting the initial values into a preset control model for optimizing a model predictive control; solving the preset control model to obtain a first solution sequence of the reactive power setting values of the wind turbines and a second solution sequence of the terminal voltage setting values of the static var generators; and sending first values in the first solution sequence to the wind turbines and first values in the second solution sequence to the static var generators, such that a voltage control in the wind farm is realized.

17 Claims, 1 Drawing Sheet

METHOD AND APPARATUS FOR CONTROLLING VOLTAGE IN WIND FARM

CROSS-REFERENCE TO RELATED APPLICATION

This application claims priority to and benefits of Chinese Patent Application No. 201410437727.6, filed with the State Intellectual Property Office of P. R. China on Aug. 29, 2014, the entire contents of which are incorporated herein by reference.

FIELD

The present disclosure relates to a technology flied of an automatic voltage control of a wind farm in a power system, and more particularly relates to a method for controlling a voltage in a wind farm and an apparatus for controlling a voltage in a wind farm.

BACKGROUND

In recent years, the capacity of wind power common coupling system grows continually and rapidly. Accordingly, problems about the voltage in large-scale wind power integration areas occur. If wind energy resources are far away from load centers, the wind power will be coupled into weak parts of the power system lacking of the support of regular water or thermal power plants, so regional voltages in these parts are easily affected by active and reactive powers of the wind farm. When the wind gusts, the wind power may fluctuate significantly in a minute, thereby resulting in a drastic fluctuation of the voltage at a point of common coupling.

Currently, in wind farms put into operation in the worksite, voltage controllers are mostly designed with reference to conventional thermal power plants, i.e. wind turbines and SVCs/SVGs (Static Var Compensators/Static Var Generators) are viewed as different reactive power sources and less consideration is took on differences of response characteristics thereof. Conventional control methods give priority to a current state optimization but ignore influences on a future state of the system during the reactive power adjusting process of the wind turbines and the SVCs/SVGs. In order to avoid voltage oscillations due to the mismatching between the reactive power adjustment and a system state at the time when the adjustment is completed, a smaller reactive power adjusting step length is set and the voltages are controlled by a way of multistep approaching during the controlling process. When the wind fluctuates rapidly, in the case that the reactive power adjustments of the wind turbines are limited, the SVCs/SVGs track voltage targets, such that their own dynamic reactive power reserves are exhausted firstly, and then a problem that no support can be provided in the case of emergency or voltage fluctuating drastically in future is brought.

SUMMARY

According to a first aspect of embodiments of the present disclosure, there is provided a method for controlling a voltage in a wind farm, in which the method is applied in a control of an automatic voltage control system in the wind farm and includes: collecting measured values of parameters as initial values of prediction values of the parameters, in which the prediction values comprise active power prediction values of wind turbines, reactive power prediction values of the wind turbines, terminal voltage prediction values of the wind turbines, a reactive power prediction value of a static var generator, a terminal voltage prediction value of the static var generator and a voltage prediction value of a bus at a point of common coupling; inputting the initial values into a preset control model for optimizing a model predictive control, in which the preset control model comprises an objective function and constraint conditions, the objective function is a function established according to the voltage prediction value of the bus at the point of common coupling and the reactive power prediction value of the static var generator, and configured to optimize reactive power setting values of the wind turbines and a terminal voltage setting value of the static var generator, the constraint conditions comprise a first constraint condition of the active power prediction values of the wind turbines, a second constraint condition of the reactive power prediction values of the wind turbines, a third constraint condition of the reactive power prediction value of the static var generator, a fourth constraint condition of the terminal voltage prediction values of the wind turbines, the terminal voltage prediction value of the static var generator and the voltage prediction value of the bus at the point of common coupling and a fifth constraint condition of a system voltage, the reactive power prediction values of the wind turbines, and the reactive power prediction value of the static var generator; solving the preset control model to obtain a first solution sequence of the reactive power setting values of the wind turbines and a second solution sequence of the terminal voltage setting value of the static var generator within a time window; sending first values in the first solution sequence to the wind turbines and a first value in the second solution sequence to the static var generator, such that a voltage control in the wind farm is realized.

According to a second aspect of embodiments of the present disclosure, there is provided an apparatus for controlling a voltage in a wind farm, in which the apparatus is applied in a control of an automatic voltage control system in the wind farm and includes:

a processor; and a memory for storing instructions executable by the processor;

in which the processor is configured to collect measured values of parameters as initial values of prediction values of the parameters, in which the prediction values comprise active power prediction values of wind turbines, reactive power prediction values of the wind turbines, terminal voltage prediction values of the wind turbines, a reactive power prediction value of a static var generator, a terminal voltage prediction value of the static var generator and a voltage prediction value of a bus at a point of common coupling;

input the initial values into a preset control model for optimizing a model predictive control, in which the preset control model comprises an objective function and constraint conditions, the objective function is a function established according to the voltage prediction value of the bus at the point of common coupling, the reactive power prediction value of the static var generator and configured to optimize reactive power setting values of the wind turbines and a terminal voltage setting value of the static var generator, the constraint conditions comprise a first constraint condition of the active power prediction values of the wind turbines, a second constraint condition of the reactive power prediction values of the wind turbines, a third constraint condition of the reactive power prediction value of the static var generator, a fourth constraint condition of the terminal voltage prediction values of the wind turbines, the terminal voltage prediction value of the static var generator and the voltage prediction value of the bus at the point of common coupling and a fifth constraint condition of a system voltage, the reactive power prediction values of the wind turbines, and the reactive power prediction value of the static var generator;

solve the preset control model to obtain a first solution sequence of the reactive power setting values of the wind turbines and a second solution sequence of the terminal voltage setting value of the static var generator within a time window;

send first values in the first solution sequence to the wind turbines and a first value in the second solution sequence to the static var generator, such that a voltage control in the wind farm is realized.

According to a third aspect of embodiments of the present disclosure, there is provided a non-transitory computer-readable storage medium having stored therein instructions that, when executed by a processor of a computer, causes the computer to perform the method for controlling a voltage in a wind farm according to the first aspect of embodiments of the present disclosure.

The technical solutions provided by embodiments of the present disclosure have following advantageous effects.

Based on real-time operation data and historical operation data of reactive power devices in the wind farm, a prediction model of the active powers of the wind turbines, the reactive powers of the wind turbines and the reactive powers of the static var generators is designed, which may estimate voltage changes in the wind farm within a period of time. Compared to the conventional control method of using the current state as a control criterion, it is possible to achieve a coordination of fast reactive power devices and slow reactive power devices during operation. The method for controlling a voltage in a wind farm according to embodiments of the present disclosure may be used in the automatic voltage control system in the wind farm, and the automatic voltage control system may vary in real-time with the powers of the wind farm, and may ensure the voltage security in the wind farm and complete voltage control objectives at the points of common coupling delivered from a control center, so as to implement the most appropriate control strategy.

It is to be understood that both the foregoing general description and the following detailed description are exemplary and explanatory only and are not restrictive of the invention, as claimed.

BRIEF DESCRIPTION OF THE DRAWINGS

In order to explicitly illustrate embodiments of the present disclosure, a brief introduction for the accompanying drawings corresponding to the embodiments will be listed as follows. Apparently, the drawings described below are only corresponding to some embodiments of the present disclosure, and those skilled in the art may obtain other drawings according to these drawings without creative labor.

Embodiments of the present disclosure have already been illustrated with reference to above drawings, and will be described more detail in the following description. These drawings and text description are not intended to limit the scope of the present disclosure in any way, but are used to explain the concept of the present disclosure to those skilled in the art with reference to special embodiments.

DETAILED DESCRIPTION

In order to make objectives, technical solutions and advantages of the present disclosure clearer, in the following the present disclosure will be described in detail with reference to drawings. Apparently, the described embodiments are only some embodiments of the present disclosure and do not represent all the embodiments. Based on the embodiment described herein, all the other embodiments obtained by those skilled in the art without creative labor belong to the protection scope of the present disclosure.

Figure 1:
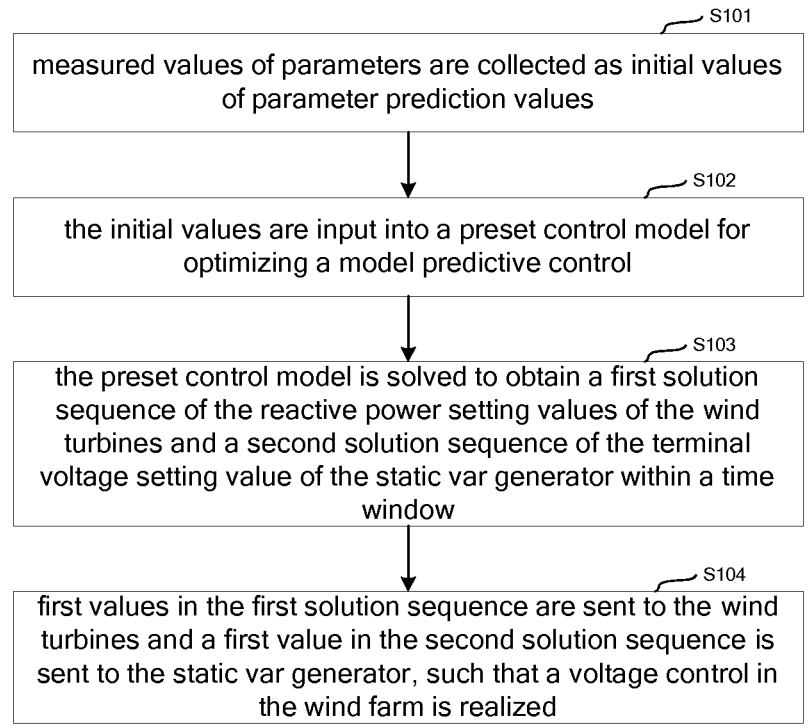
FIG. 1 is a flow chart of a method for controlling a voltage in a wind farm according to an exemplary embodiment.

FIG. 1 is a flow chart of a method for controlling a voltage in a wind farm according to an exemplary embodiment. The method is applied in a control of an automatic voltage control system in the wind power farm. As shown in FIG. 1, in each control cycle (determined according to the communication condition in the wind power farm, in this embodiment, it is set to be 2 s), the method includes following steps.

In step S101, measured values of parameters are collected as initial values of prediction values of the parameters, in which the prediction values include active power prediction values $P_{WTG}^{pre}$ of wind turbines, reactive power prediction values $Q_{WTG}^{pre}$ of the wind turbines, terminal voltage prediction values $V_{WTG}^{pre}$ of the wind turbines, a reactive power prediction value $Q_{SVG}^{pre}$ of a static var generator, a terminal voltage prediction value $V_{SVG}^{pre}$ of the static var generator and a voltage prediction value $V_{PCC}^{pre}$ of a bus at a point of common coupling.

In step S102, the initial values are input into a preset control model for optimizing a model predictive control.

The preset control model includes an objective function and constraint conditions, the objective function is a function established according to the voltage prediction value $V_{PCC}^{pre}$ of the bus at the point of common coupling, a voltage reference value $V_{PCC}^{ref}$ of the bus at the point of common coupling, the reactive power prediction value $Q_{SVG}^{pre}$ of static var generator and optimum reactive power of the static var generator, and configured to optimize reactive power setting values $Q_{WTG}^{set}$ of the wind turbines and a terminal voltage setting value $V_{SVG}^{set}$ of the static var generator, the constraint conditions includes a first constraint condition of the active power prediction values of the wind turbines, a second constraint condition of the reactive power prediction values of the wind turbines, a third constraint condition of the reactive power prediction value of the static var generator, a fourth constraint condition of the terminal voltage prediction values of the wind turbines, the terminal voltage prediction value of the static var generator and the voltage prediction value of the bus at the point of common coupling and a fifth constraint condition of a system voltage, the reactive power prediction values of the wind turbines, and the reactive power prediction value of the static var generator.

In some embodiments, the method further includes a step of establishing the preset control model (not shown in FIG. 1).

The model predictive control (MPC) is an important method in the Process Control Theory, and is widely applied in many industries such as petroleum industries, chemical industries, metallurgy industries, machinery industries. In the power system, the MPC is mainly used in the field of grid voltage control, the field of stabilizing voltage, the field of active power scheduling, the field of stored energy management, etc., and has the advantages in control effect and robustness. The current control action of the MPC is obtained by solving a finite horizon open-loop optimal control problem at every sampling moment. The current state of the process is used as the initial state of the optimal control, and the optimal control sequence only performs the first control action.

Firstly, the objective function is established according to formula (1)

$$\min_{Q_{WTG}^{set}, V_{SVG}^{set}} \left( \sum_{i=0}^{N-1} \sum_{j=0}^{M-1} \rho^{t_{i,j}} F_1, \sum_{i=0}^{N-1} \sum_{j=0}^{M-1} \rho^{t_{i,j}} F_2 \right) \quad (1)$$

where $Q_{WTG}^{set}$ represents the reactive power setting values of the wind turbines, $V_{SVG}^{set}$ represents the terminal voltage setting value of the static var generator, N represents a number of control cycles in the time window (there is a case that the wind fluctuates drastically within several tens of seconds in the wind power farm, a length of the time window in the MPC optimization may be ten seconds to tens of seconds, for example, in this embodiment, the length of the time window is 20 s and a typically control period of an automatic voltage control system (AVC) in the wind farm is 2 s, and N is 10), M represents a number of predicted points in a single control cycle (which is used to refine the change process of system states in the time scale, for example M may be 4), ρ is an attenuation coefficient, ρ<1, $t_{i,j}$=(Mi+j)Δt represents a prediction time corresponding to a (j+1)$^{th}$ predicted point in a (i+1)$^{th}$ control cycle, Δt represents a time interval between prediction time corresponding to each two adjacent predicted points and is determined according to a time interval of predicting a wind farm power (for example, Δt may be 0.5 s).

$F_1$ represents a deviation between the voltage prediction value of the bus at the point of common coupling and a voltage reference value of the bus at the point of common coupling, in which $F_1$ is denoted by formula (2)

$$F_1(t_{i,j}) = [V_{PCC}^{pre}(t_{i,j}) - V_{PCC}^{ref}]^2 \quad (2)$$

where $F_1(t_{i,j})$ represents a deviation between the voltage prediction value of the bus at the point of common coupling and a voltage reference value of the bus at the point of common coupling at the prediction time $t_{i,j}$, $V_{PCC}^{pre}(t_{i,j})$ represents the voltage prediction value of the bus at the point of common coupling at the prediction time $t_{i,j}$, $V_{PCC}^{ref}$ represents the voltage reference value of the bus at the point of common coupling and is obtained from the AVC;

$F_2$ represents a reactive power reserve of the static var generator, in which $F_2$ is denoted by formula (3)

$$F_2(t_{i,j}) = [Q_{SVG}^{pre}(t_{i,j}) - Q_{SVG}^{opr}]^2 \quad (3)$$

where $F_2(t_{i,j})$ represents a reactive power reserve of the static var generator at the prediction time $t_{i,j}$, $Q_{SVG}^{pre}$ represents the reactive power prediction value of the static var generator at the prediction time $t_{i,j}$, $Q_{SVG}^{opr}$ represents optimum reactive power of the static var generator and varies from wind farm to wind farm (for example, in this embodiment, $Q_{SVG}^{opr}$ may be average reactive powers of the SVGs).

The first constraint condition is denoted by formula (7)

$$P_{WTG}^{pre}(t_{i,j}) = \sum_{k1=1}^{N_a} \phi_{k1} P_{WTG}^{pre}(t_{i,j-k1}) + \varepsilon_{WTG}^{pre}(t_{i,j}) - \sum_{k2=1}^{N_m} \theta_{k2} \varepsilon_{WTG}^{pre}(t_{i,j-k2}) \quad (7)$$

where $P_{WTG}^{pre}(t_{i,j})$ represents the active power prediction values of the wind turbines at the prediction time $t_{i,j}$, $\varepsilon_{WTG}^{pre}(t_{i,j})$ represents errors of the active power prediction values of the wind turbines at the prediction time $t_{i,j}$, $P_{WTG}^{pre}(t_{i,j-k1})$ represents the active power prediction values of the wind turbines at a prediction time $t_{i,j-k1}$, $t_{i,j-k1}$=(Mi+j-k1)Δt, $\varepsilon_{WTG}^{pre}(t_{i,j-k2})$ represents the errors of the active power prediction values of the wind turbines at the prediction time $t_{i,j-k2}$, $t_{i,j-k2}$=(Mi+j-k2)Δt and $t_{i,j-k2}$ represents a prediction time corresponding to a (j-k2+1)$^{th}$ predicted point in the (i+1)$^{th}$ control cycle, such as it may be a time corresponding to the data (including $P_{WTG}^{pre}$ and $\varepsilon_{WTG}^{pre}$) participating the calculation, if $t_{i,j-k1}$≤0, the active power prediction values of the wind turbines are historical values at a corresponding time, $N_a$ represents an order number of an auto regression model, $N_m$ represents an order number of a moving average model, $\varphi_{k1}$ and $\theta_{k2}$ represent relative weights corresponding respectively to the $P_{WTG}^{pre}(t_{i,j-k1})$ and $\varepsilon_{WTG}^{pre}(t_{i,j-k2})$.

The second constraint condition is denoted by formula (8):

$$Q_{WTG}^{pre}(t_{i,j}) = \quad (8)$$
$$\frac{1 - e^{-(t_{i,j} - t_{i,0})/T_s}}{1 - e^{-M\Delta t/T_s}} Q_{WTG}^{set}(t_{i,0}) + \frac{e^{-(t_{i,j} - t_{i,0})/T_s} - e^{-M\Delta t/T_s}}{1 - e^{-M\Delta t/T_s}} Q_{WTG}^{pre}(t_{i,0})$$
$$Q_{WTG}^{pre}(t_{i,0}) = Q_{WTG}^{set}(t_{i-1,0})$$

First, the reactive power prediction values of the wind turbines reach the reactive power setting values of the wind turbines before a next control cycle, thus $$Q_{WTG}^{pre}(t_{i,0}) = Q_{WTG}^{set}(t_{i-1,0})$$

where $Q_{WTG}^{pre}(t_{i,0})$ represents the reactive power prediction values of the wind turbines at the prediction time $t_{i,0}$, $Q_{WTG}^{set}(t_{i-1,0})$ represents the reactive power setting values of the wind turbines at a prediction time $t_{i-1,0}$, $t_{i-1,0}$ represents a prediction time corresponding to a first predicted point in a i$^{th}$ control cycle.

For each predicted point in the (i+1)$^{th}$ control cycle, changes of the reactive power prediction values of the wind turbines may be fitted according to an exponential function, which is denoted by the formula of $$Q_{WTG}^{pre}(t_{i,j}) =$$
$$\frac{1 - e^{-(t_{i,j} - t_{i,0})/T_s}}{1 - e^{-M\Delta t/T_s}} Q_{WTG}^{set}(t_{i,0}) + \frac{e^{-(t_{i,j} - t_{i,0})/T_s} - e^{-M\Delta t/T_s}}{1 - e^{-M\Delta t/T_s}} Q_{WTG}^{pre}(t_{i,0})$$

where $Q_{WTG}^{pre}(t_{i,j})$ is a component of $Q_{WTG}^{pre}(t_{i,j})$ and represents a reactive power prediction value of a wind turbine at the prediction time $t_{i,j}$, $Q_{WTG}^{pre}(t_{i,j})$ represents the reactive power prediction values of the wind turbines at the prediction time $t_{i,j}$, $Q_{WTG}^{set}(t_{i,0})$ is a component of $Q_{WTG}^{set}(t_{i,0})$ and represents a reactive power setting value of the wind turbine at the prediction time $t_{i,0}$, $Q_{WTG}^{set}(t_{i,0})$ represents the reactive power setting values of the wind turbines at the prediction time) $t_{i,0}$, $Q_{WTG}^{pre}(t_{i,0})$ is a component of $Q_{WTG}^{pre}(t_{i,0})$, $T_s$ represents a time constant of adjusting the reactive powers of the wind turbines and is obtained according to a reactive power adjustment test of the wind turbines.

The third constraint condition is denoted by formula (9):

$$Q_{SVG}^{pre}(t_{i,j}) = Q_{SVG}^{ref}(t_{i,j-1}) + [Q_{SVG}^{pre}(t_{i,j-1}) - Q_{SVG}^{ref}(t_{i,j-1})]e^{-(t_{i,j}-t_{i,j-1})/T_d}$$

$$Q_{SVG}^{ref}(t_{i,j}) = \quad (9)$$
$$K_P[V_{SVG}^{pre}(t_{i,j}) - V_{SVG}^{set}(t_{i,0})] + K_I\Delta t \sum_{k3=0}^{i \times M+j} [V_{SVG}^{pre}(t_{i,j-k3}) - V_{SVG}^{set}(t_{i,-k3})] +$$
$$Q_{SVG}^{pre}(t_{0,0}) - K_P[V_{SVG}^{pre}(t_{0,0}) - V_{SVG}^{set}(t_{0,0})]$$

The reactive power reference values of the static var generators are denoted by a formula of $$Q_{SVG}^{ref}(t_{i,j}) = \quad (9)$$
$$K_P[V_{SVG}^{pre}(t_{i,j}) - V_{SVG}^{set}(t_{i,0})] + K_I\Delta t \sum_{k3=0}^{i \times M+j} [V_{SVG}^{pre}(t_{i,j-k3}) - V_{SVG}^{set}(t_{i,-k3})] +$$
$$Q_{SVG}^{pre}(t_{0,0}) - K_P[V_{SVG}^{pre}(t_{0,0}) - V_{SVG}^{set}(t_{0,0})]$$

where $Q_{SVG}^{ref}(t_{i,j})$ represents the reactive power reference value of the static var generator at the prediction time $t_{i,j}$, $V_{SVG}^{pre}(t_{i,j-k3})$ represents the terminal voltage prediction value of the static var generator at a prediction time $t_{i,j-k3}$, $t_{i,j-k3}=(Mi+j-k3)\Delta t$, $V_{SVG}^{set}(t_{i,-k3})$ represents the terminal voltage setting value of the static var generator at a prediction time $t_{i,-k3}$, $t_{i,-k3}=(Mi-k3)\Delta t$, $Q_{SVG}^{pre}(t_{0,0})$ represents the reactive power prediction value of the static var generator at a current time $t_{0,0}$, $V_{SVG}^{pre}(t_{0,0})$ represents the terminal voltage prediction value of the static var generator at the current time $t_{0,0}$, $V_{SVG}^{set}(t_{0,0})$ represents the terminal voltage setting value of the static var generator at the current time $t_{0,0}$, $K_I$ represents a coefficient in a proportion calculation, $K_P$ represents a coefficient in an integral calculation. ($K_I$ and $K_P$ are determined by reactive power controller parameters of the SVGs, and if the reactive power reference values are beyond a range bounded by upper limits and lower limits of the reactive powers of the SVGs, i.e. $[Q_{SVG}^{min}, Q_{SVG}^{max}]$, $K_I$ and $K_P$ are respectively close to the lower limits or the upper limits).

The reactive power prediction values of the static var generators are denoted by a formula of $$Q_{SVG}^{pre}(t_{i,j}) = Q_{SVG}^{ref}(t_{i,j-1}) + [Q_{SVG}^{pre}(t_{i,j-1}) - Q_{SVG}^{ref}(t_{i,j-1})]e^{-(t_{i,j}-t_{i,j-1})/T_d}$$

where $Q_{SVG}^{pre}(t_{i,j})$ represents the reactive power prediction value of the static var generator at the prediction time $t_{i,j}$, $Q_{SVG}^{ref}(t_{i,j-1})$ represents a reactive power reference value of the static var generator at a prediction time $t_{i,j-1}$, $Q_{SVG}^{pre}(t_{i,j-1})$ represents the reactive power prediction value of the static var generator at the prediction time $t_{i,j-1}$, $t_{i,j-1}$ represents a prediction time corresponding to a $(j-1)^{th}$ predicted point in the $i^{th}$ control cycle, $T_d$ represents a time constant representing an action delay of the static var generator.

The fourth constraint condition is denoted by formula (10)

$$V^{pre}(t_{i,j}) - V^{pre}(t_{0,0}) = S \begin{bmatrix} P_{WTG}^{pre}(t_{i,j}) - P_{WTG}^{pre}(t_{0,0}) \\ Q_{WTG}^{pre}(t_{i,j}) - Q_{WTG}^{pre}(t_{0,0}) \\ Q_{SVG}^{pre}(t_{i,j}) - Q_{SVG}^{pre}(t_{0,0}) \end{bmatrix} \quad (10)$$

where $V^{pre}(t_{i,j})$ represents a vector composing of the terminal voltage prediction values of the wind turbines, the terminal voltage prediction value of the static var generator and the voltage prediction value of the bus at the point of common coupling at the prediction time $t_{i,j}$, $V^{pre}(t_{0,0})$ represents the vector composing of the terminal voltage prediction values of the wind turbines, the terminal voltage prediction value of the static var generator and the voltage prediction value of the bus at the point of common coupling at the current time $t_{0,0}$, $P_{WTG}^{pre}(t_{0,0})$ represents the active power prediction values of the wind turbines at the current time $t_{0,0}$, $Q_{WTG}^{pre}(t_{0,0})$ represents the reactive power prediction values of the wind turbines at the current time $t_{0,0}$, S represents a sensitivity matrix (which is obtained after flow equations linearization).

The fifth constraint condition is denoted by formula (11)

$$\begin{cases} V^{min} \le V^{pre}(t_{i,j}) \le V^{max} \\ Q_{WTG}^{min} \le Q_{WTG}^{pre}(t_{i,j}) \le Q_{WTG}^{max} \\ Q_{SVG}^{min} \le Q_{SVG}^{pre}(t_{i,j}) \le Q_{SVG}^{max} \\ \Delta Q_{WTG}^{min} \le Q_{WTG}^{pre}(t_{i,0}) - Q_{WTG}^{pre}(t_{i-1,0}) \le \Delta Q_{WTG}^{max} \\ \Delta Q_{SVG}^{min} \le Q_{SVG}^{pre}(t_{i,0}) - Q_{SVG}^{pre}(t_{i-1,0}) \le \Delta Q_{SVG}^{max} \end{cases} \quad (11)$$

where $V^{max}$ and $V^{min}$ respectively represent upper limits and lower limits of the vector composing of the terminal voltage prediction values of the wind turbines, the terminal voltage prediction value of the static var generator and the voltage prediction value of the bus at the point of common coupling, the upper limit and the lower limit of the voltage prediction value of the bus at the point of common coupling are provided by a regional power grid control center, the upper limits and the lower limits of the terminal voltage prediction values of the wind turbines and the static var generators are determined according to a normal operating range provided by equipment manufacturers; $Q_{WTG}^{max}$ and $Q_{WTG}^{min}$ represent upper limits and lower limits of the reactive power prediction values of the wind turbines respectively, and $Q_{SVG}^{max}$ and $Q_{SVG}^{min}$ represent an upper limit and a lower limit of the reactive power prediction value of the static var generator respectively, and all of them are determined according to a normal operating range provided by equipment manufacturers; $Q_{WTG}^{pre}(t_{i-1,0})$ represents the reactive power prediction values of the wind turbines at the prediction time $t_{i-1,0}$, $\Delta Q_{WTG}^{max}$ and $\Delta Q_{WTG}^{min}$ represent upper limits and lower limits of reactive climbing of the wind turbines respectively, $Q_{SVG}^{pre}(t_{i,0})$ represents the reactive power prediction value of the static var generator at the prediction time $t_{i,0}$, $Q_{SVG}^{pre}(t_{i-1,0})$ represents the reactive power prediction value of the static var generator at the prediction time $t_{i-1,0}$, and $\Delta Q_{SVG}^{max}$ and $\Delta Q_{SVG}^{min}$ represent an upper limit and a lower limit of reactive climbing speed of the static var generator respectively, and all of them are determined according to experimental test results of the reactive power control.

The preset control model for optimizing a model predictive control may be established according to the above objective function and constraint conditions.

However, for simplicity, the above objective function and constraint conditions may be simplified.

Since the SVGs usually have entered a steady state within the time interval between the prediction time corresponding to each two predicted points of the model in the model predictive control, the SVGs have been adjusted in place, such that the terminal voltages reach the setting values, or the reactive powers reach the limits.

So the third constraint condition may be removed and then formula (4) is added into the objective function. The formula (4) is expressed as $$\min \sum_{i=0}^{N-1} \sum_{j=0}^{M-1} \rho^{i,j} F_3 \quad (4)$$

where $F_3$ represents a deviation between the terminal voltage prediction value of the static var generator and a terminal voltage setting value of the static var generator, in which $F_3$ is denoted by formula (5)

$$F_3(t_{i,j}) = [V_{SVG}^{pre}(t_{i,j}) - V_{SVG}^{set}(t_{i,0})]^2 \quad (5)$$

where $F_3(t_{i,j})$ represents a deviation between the terminal voltage prediction value of the static var generator and terminal voltage setting value of the static var generator at the prediction time $t_{i,j}$, $V_{SVG}^{pre}(t_{i,j})$ represents the terminal voltage prediction value of the static var generator at the prediction time $t_{i,j}$, $V_{SVG}^{set}(t_{i,0})$ represents the terminal voltage setting value of the static var generator at a prediction time $t_{i,0}$, $t_{i,0}$ represents a prediction time corresponding to a first predicted point in the $(i+1)^{th}$ control cycle.

So, the simplified objective function may be denoted by formula (6)

$$\min \sum_{i=0}^{N-1} \sum_{j=0}^{M-1} \rho^{i,j} (F_1 + \alpha F_2 + \beta F_3) \quad (6)$$

where $\alpha$ and $\beta$ represent weights corresponding respectively to $F_2$ and $F_3$, in which $\alpha$ may be set as squares of the sensitivities of the voltages at the points of common coupling to the reactive powers of the SVGs, $\beta$ may be set as squares of the sensitivities of the voltages at the points of common coupling to the terminal voltages of the SVGs.

In step S103, the preset control model is solved to obtain a first solution sequence of the reactive power setting values of the wind turbines and a second solution sequence of the terminal voltage setting value of the static var generator within a time window.

Specifically, the preset control model is solved by optimization tools (such as Cplex, Mosek etc.) to obtain the first solution sequence of $Q_{WTG}^{set}$ and the second solution sequence of $V_{SVG}^{set}$ within a time window (the model is a quadratic programming problem of the mixed integers and can be quickly solved).

In step S104, first values in the first solution sequence are sent to the wind turbines and a first value in the second solution sequence is sent to the static var generator, such that a voltage control in the wind farm is realized.

In other words, the first values in the first solution sequence and the first values in the second solution sequence are used as control targets to be sent to the wind turbines and the SVGs.

In the present disclosure, an action is performed by a device (a capacitor or a reactor) means that the device comes into or goes out of service.

The embodiments providing an apparatus of the present disclosure are as follows. The apparatus is used to implement the method according to the embodiments of the present disclosure. Concerning the details which are not described in the embodiments of the device, reference is made to the embodiments of the method.

Figure 2:
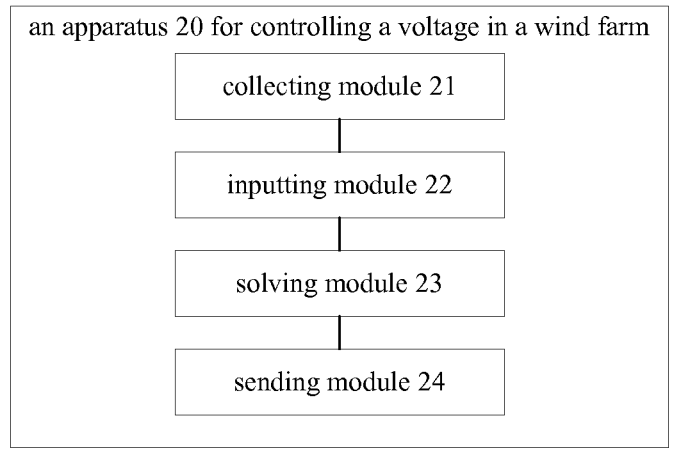
FIG. 2 is a block diagram of an apparatus for controlling a voltage in a wind farm according to an exemplary embodiment.

The apparatus is applied in a control of an automatic voltage control system in the wind farm. As shown in FIG. 2, the apparatus 20 includes a collecting module 21, an inputting module 22, a solving module 23 and a sending module 24.

The collecting module 21 is configured to collect measured values of parameters as initial values of prediction values of the parameters, wherein the prediction values comprise active power prediction values of wind turbines, reactive power prediction values of the wind turbines, terminal voltage prediction values of the wind turbines, a reactive power prediction value of a static var generator, a terminal voltage prediction value of the static var generator and a voltage prediction value of a bus at a point of common coupling.

The inputting module 22 is configured to input the initial values into a preset control model for optimizing a model predictive control, wherein the preset control model comprises an objective function and constraint conditions, the objective function is a function established according to the voltage prediction value of the bus at the point of common coupling, the reactive power prediction value of the static var generator and configured to optimize reactive power setting values of the wind turbines and a terminal voltage setting value of the static var generator, the constraint conditions comprise a first constraint condition of the active power prediction values of the wind turbines, a second constraint condition of the reactive power prediction values of the wind turbines, a third constraint condition of the reactive power prediction value of the static var generator, a fourth constraint condition of the terminal voltage prediction values of the wind turbines, the terminal voltage prediction value of the static var generator and the voltage prediction value of the bus at the point of common coupling and a fifth constraint condition of a system voltage, the reactive power prediction values of the wind turbines, and the reactive power prediction value of the static var generator.

The solving module 23 is configured to solve the preset control model to obtain a first solution sequence of the reactive power setting values of the wind turbines and a second solution sequence of the terminal voltage setting value of the static var generator within a time window.

The sending module 24 is configured to send first values in the first solution sequence to the wind turbines and a first value in the second solution sequence to the static var generator, such that a voltage control in the wind farm is realized.

In some embodiment, the apparatus further includes an establishing module, configured to establish the preset control model.

In some embodiment, the establishing module includes an establishing unit and a simplifying unit.

The establishing unit is configured to establish the objective function according to formula (1)

$$\min_{Q_{WTG}^{set}, V_{SVG}^{set}} \left( \sum_{i=0}^{N-1} \sum_{j=0}^{M-1} \rho^{i,j} F_1, \sum_{i=0}^{N-1} \sum_{j=0}^{M-1} \rho^{i,j} F_2 \right) \quad (1)$$

where $Q_{WTG}^{set}$ represents the reactive power setting values of the wind turbines, $V_{SVG}^{set}$ represents the terminal voltage setting value of the static var generator, N represents a number of control cycles in the time window, M represents a number of predicted points in a single control cycle, ρ is an attenuation coefficient, ρ<1, $t_{i,j}=(Mi+j)\Delta t$ represents a prediction time corresponding to a $(j+1)^{th}$ predicted point in a $(i+1)^{th}$ control cycle, $\Delta t$ represents a time interval between prediction time corresponding to each two adjacent predicted points, $F_1$ represents a deviation between the voltage prediction value of the bus at the point of common coupling and voltage reference value of the bus at the point of common coupling, $F_2$ represents a reactive power reserve of the static var generator, in which $F_1$ is denoted by formula (2)

$$F_1(t_{i,j})=[V_{PCC}^{pre}(t_{i,j})-V_{PCC}^{ref}]^2 \qquad (2)$$

where $F_1(t_{i,j})$ represents a deviation between the voltage prediction value of the bus at the point of common coupling and a voltage reference value of the bus at the point of common coupling at the prediction time $t_{i,j}$, $V_{PCC}^{pre}(t_{i,j})$ represents the voltage prediction value of the bus at the point of common coupling at the prediction time $t_{i,j}$, $V_{PCC}^{ref}$ represents the voltage reference value of the bus at the point of common coupling;

$F_2$ is denoted by formula (3)

$$F_2(t_{i,j})=[Q_{SVG}^{pre}(t_{i,j})-Q_{SVG}^{opr}]^2 \qquad (3)$$

where $F_2(t_{i,j})$ represents a reactive power reserve of the static var generator at the prediction time $t_{i,j}$, $Q_{SVG}^{pre}(t_{i,j})$ represents the reactive power prediction value of the static var generator at the prediction time $t_{i,j}$, $Q_{SVG}^{opr}$ represents optimum reactive power of the static var generator;

The simplifying unit is configured to simplify the objective function formula (4) to obtain a simplified objective function, in which the formula (4) is expressed as $$\min\sum_{i=0}^{N-1}\sum_{j=0}^{M-1}\rho^{i,j}F_3, \qquad (4)$$

where $F_3$ represents a deviation between the terminal voltage prediction value of the static var generator and a terminal voltage setting value of the static var generator; $F_3$ is denoted by formula (5):

$$F_3(t_{i,j})=[V_{SVG}^{pre}(t_{i,j})-V_{SVG}^{set}(t_{i,0})]^2 \qquad (5)$$

where $F_3(t_{i,j})$ represents a deviation between the terminal voltage prediction value of the static var generator and terminal voltage setting value of the static var generator at the prediction time $t_{i,j}$, $V_{SVG}^{pre}(t_{i,j})$ represents the terminal voltage prediction value of the static var generator at the prediction time $t_{i,j}$, $V_{SVG}^{set}(t_{i,0})$ represents the terminal voltage setting value of the static var generator at a prediction time $t_{i,0}$, $t_{i,0}$ represents a prediction time corresponding to a first predicted point in the $(i+1)^{th}$ control cycle;

the simplified objective function is denoted by formula (6)

$$\min\sum_{i=0}^{N-1}\sum_{j=0}^{M-1}\rho^{i,j}(F_1+\alpha F_2, \beta F_3) \qquad (6)$$

where α and β represent weights corresponding respectively to $F_2$ and $F_3$.

Embodiments of the present disclosure further provide a non-transitory computer readable storage medium. The non-transitory computer readable storage medium according to embodiments of the present disclosure may include instructions that, when executed by a processor of an apparatus, causes the apparatus to execute a method for controlling a voltage in a wind farm as above embodiments of the method.

The technical solutions provided by embodiments of the present disclosure have following advantageous effects.

Based on real-time and historical operation data of reactive devices (the wind turbines and the static var generator) in the wind farm, a prediction model of the active powers of the wind turbines, the reactive powers of the wind turbines and the reactive powers of the static var generators is designed, which may estimate voltage changes within a period of time in the wind farm. Comparing to the conventional method of using the current state as a control criterion, it is possible to achieve fast and slow coordination of the reactive devices during operation. With the method for controlling a voltage in a wind farm according to embodiments of the present disclosure, which may be integrated into the automatic voltage control system operating in the wind farm, and the automatic voltage control system may implement the most appropriate control strategy according to power charges of the wind farm in real-time, meanwhile a voltage security may be ensured and voltage control objectives at the points of common coupling from a control center may be completed.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in a almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present disclosure may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The non-transitory computer-readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for controlling a voltage in a wind farm, wherein the method is applied in a control of an automatic voltage control system in the wind farm and comprises:
    collecting measured values of parameters as initial values of prediction values of the parameters, wherein the prediction values comprise active power prediction values of wind turbines, reactive power prediction values of the wind turbines, terminal voltage prediction values of the wind turbines, a reactive power prediction value of a static var generator, a terminal voltage prediction value of the static var generator and a voltage prediction value of a bus at a point of common coupling;
    inputting the initial values into a preset control model for optimizing a model predictive control, wherein the preset control model comprises an objective function and constraint conditions, the objective function is a function established according to the voltage prediction value of the bus at the point of common coupling and the reactive power prediction value of the static var generator, and configured to optimize reactive power setting values of the wind turbines and a terminal voltage setting value of the static var generator, the constraint conditions comprise a first constraint condition of the active power prediction values of the wind turbines, a second constraint condition of the reactive power prediction values of the wind turbines, a third constraint condition of the reactive power prediction value of the static var generator, a fourth constraint condition of the terminal voltage prediction values of the wind turbines, the terminal voltage prediction value of the static var generator and the voltage prediction value of the bus at the point of common coupling and a fifth constraint condition of a system voltage, the reactive power prediction values of the wind turbines, and the reactive power prediction value of the static var generator;
    solving the preset control model to obtain a first solution sequence of the reactive power setting values of the wind turbines and a second solution sequence of the terminal voltage setting value of the static var generator within a time window;
    sending first values in the first solution sequence to the wind turbines and a first value in the second solution sequence to the static var generator, such that a voltage control in the wind farm is realized.

2. The method according to claim 1, further comprising: establishing the preset control model.

3. The method according to claim 2, wherein establishing the preset control model comprises:
    establishing the objective function according to formula (1):

$$\min_{Q_{WTG}^{set}, V_{SVG}^{set}} \left( \sum_{i=0}^{N-1} \sum_{j=0}^{M-1} \rho^{t_i,j} F_1, \sum_{i=0}^{N-1} \sum_{j=0}^{M-1} \rho^{t_i,j} F_2 \right) \quad (1)$$

where $Q_{WTG}^{set}$ represents the reactive power setting values of the wind turbines, $V_{SVG}^{set}$ represents the terminal voltage setting value of the static var generator, N represents a number of control cycles in the time window, M represents a number of predicted points in a single control cycle, $\rho$ is an attenuation coefficient, $\rho<1$, $t_{i,j}=(Mi+j)\Delta t$ represents a prediction time corresponding to a $(j+1)^{th}$ predicted point in a $(i+1)^{th}$ control cycle, $\Delta t$ represents a time interval between prediction time corresponding to each two adjacent predicted points, $F_1$ represents a deviation between the voltage prediction value of the bus at the point of common coupling and a voltage reference value of the bus at the point of common coupling, $F_2$ represents a reactive power reserve of the static var generator, wherein $F_1$ is denoted by formula (2):

$$F_1(t_{i,j}) = [V_{PCC}^{pre}(t_{i,j}) - V_{PCC}^{ref}]^2 \quad (2)$$

where $F_1(t_{i,j})$ represents a deviation between the voltage prediction value of the bus at the point of common coupling and a voltage reference value of the bus at the point of common coupling at the prediction time $t_{i,j}$, $V_{PCC}^{pre}(t_{i,j})$ represents the voltage prediction value of the bus at the point of common coupling at the prediction time $t_{i,j}$, $V_{PCC}^{ref}$ represents the voltage reference value of the bus at the point of common coupling;

$F_2$ is denoted by formula (3):

$$F_2(t_{i,j}) = [Q_{SVG}^{pre}(t_{i,j}) - Q_{SVG}^{opr}]^2 \quad (3)$$

where $F_2(t_{i,j})$ represents a reactive power reserve of the static var generator at the prediction time $t_{i,j}$, $Q_{SVG}^{pre}(t_{i,j})$ represents the reactive power prediction value of the static var generator at the prediction time $t_{i,j}$, $Q_{SVG}^{opr}$ represents optimum reactive power of the static var generator;

simplifying the objective function according to formula (4) to obtain a simplified objective function, wherein the formula (4) is expressed as $$\min \sum_{i=0}^{N-1} \sum_{j=0}^{M-1} \rho^{t_{i,j}} F_3, \quad (4)$$

where $F_3$ represents a deviation between the terminal voltage prediction value of the static var generator and terminal voltage setting value of the static var generator; $F_3$ is denoted by formula (5):

$$F_3(t_{i,j}) = [V_{SVG}^{pre}(t_{i,j}) - V_{SVG}^{set}(t_{i,0})]^2 \quad (5)$$

where $F_3(t_{i,j})$ represents a deviation between the terminal voltage prediction value of the static var generator and terminal voltage setting value of the static var generator at the prediction time $t_{i,j}$, $V_{SVG}^{pre}(t_{i,j})$ represents the terminal voltage prediction value of the static var generator at the prediction time $t_{i,j}$, $V_{SVG}^{set}(t_{i,0})$ represents the terminal voltage setting value of the static var generator at a prediction time $t_{i,0}$, $t_{i,0} = (Mi)\Delta t$ represents a prediction time corresponding to a first predicted point in the $(i+1)^{th}$ control cycle;

the simplified objective function is denoted by formula (6):

$$\min \sum_{i=0}^{N-1} \sum_{j=0}^{M-1} \rho^{t_{i,j}} (F_1 + \alpha F_2 + \beta F_3) \quad (6)$$

where $\alpha$ and $\beta$ represent weights corresponding respectively to $F_2$ and $F_3$.

4. The method according to claim 3, wherein the first constraint condition is denoted by formula (7):

$$P_{WTG}^{pre}(t_{i,j}) = \sum_{k1=1}^{N_a} \phi_{k1} P_{WTG}^{pre}(t_{i,j-k1}) + \varepsilon_{WTG}^{pre}(t_{i,j}) - \sum_{k2=1}^{N_m} \theta_{k2} \varepsilon_{WTG}^{pre}(t_{i,j-k2}) \quad (7)$$

where $P_{WTG}^{pre}(t_{i,j})$ represents the active power prediction values of the wind turbines at the prediction time $t_{i,j}$, $\varepsilon_{WTG}^{pre}(t_{i,j})$ represents errors of the active power prediction values of the wind turbines at the prediction time $t_{i,j}$, $P_{WTG}^{pre}(t_{i,j-k1})$ represents the active power prediction values of the wind turbines at a prediction time $t_{i,j-k1}$, $t_{i,j-k1} = (Mi+j-k1)\Delta t$, $\varepsilon_{WTG}^{pre}(t_{i,j-k2})$ represents the errors of the active power prediction values of the wind turbines at a prediction time $t_{i,j-k2}$, $t_{i,j-k2} = (Mi+j-k2)\Delta t$, if $t_{i,j-k1} \leq 0$, the active power prediction values of the wind turbines are historical values at a corresponding time, $N_a$ represents an order number of an auto regression model, $N_m$ represents an order number of a moving average model, $\varphi_{k1}$ and $\theta_{k2}$ represent relative weights corresponding respectively to the $P_{WTG}^{pre}(t_{i,j-k1})$ and $\varepsilon_{WTG}^{pre}(t_{i,j-k2})$.

5. The method according to claim 4, wherein the second constraint condition is denoted by formula (8):

$$Q_{WTG}^{pre}(t_{i,j}) = \quad (8)$$

$$\frac{1 - e^{-(t_{i,j} - t_{i,0})/T_s}}{1 - e^{-M\Delta t/T_s}} Q_{WTG}^{set}(t_{i,0}) + \frac{e^{-(t_{i,j} - t_{i,0})/T_s} - e^{-M\Delta t/T_s}}{1 - e^{-M\Delta t/T_s}} Q_{WTG}^{pre}(t_{i,0})$$

$$Q_{WTG}^{pre}(t_{i,0}) = Q_{WTG}^{set}(t_{i-1,0})$$

where $Q_{WTG}^{pre}(t_{i,j})$ is a component of $Q_{WTG}^{pre}(t_{i,j})$ and represents a reactive power prediction value of a wind turbine at the prediction time $t_{i,j}$, $Q_{WTG}^{pre}(t_{i,j})$ represents the reactive power prediction values of the wind turbines at the prediction time $t_{i,j}$, $Q_{WTG}^{set}(t_{i,0})$ is a component of $Q_{WTG}^{set}(t_{i,0})$ and represents a reactive power setting value of the wind turbine at the prediction time $t_{i,0}$, $Q_{WTG}^{set}(t_{i,0})$ represents the reactive power setting values of the wind turbines at the prediction time $t_{i,0}$, $Q_{WTG}^{pre}(t_{i,0})$ is a component of $Q_{WTG}^{pre}(t_{i,0})$ and represents a reactive power prediction value of the wind turbine at the prediction time $t_{i,0}$, $Q_{WTG}^{set}(t_{i-1,0})$ is a component of $Q_{WTG}^{set}(t_{i-1,0})$ and represents a reactive power setting value of the wind turbine at a prediction time $t_{i-1,0}$, $Q_{WTG}^{pre}(t_{i,0})$ represents the reactive power prediction values of the wind turbines at the prediction time $t_{i,0}$, $Q_{WTG}^{set}(t_{i-1,0})$ represents the reactive power setting values of the wind turbines at the prediction time $t_{i-1,0}$, $t_{i-1,0} = (M(i-1))\Delta t$ represents a prediction time corresponding to a first predicted point in a $i^{th}$ control cycle, $T_s$ represents a time constant of adjusting the reactive powers of the wind turbines.

6. The method according to claim 5, wherein the third constraint condition is denoted by formula (9):

$$Q_{SVG}^{pre}(t_{i,j}) = Q_{SVG}^{ref}(t_{i,j-1}) + [Q_{SVG}^{pre}(t_{i,j-1}) - Q_{SVG}^{ref}(t_{i,j-1})]e^{-(t_{i,j} - t_{i,j-1})/T_d} \quad (9)$$

$$Q_{SVG}^{ref}(t_{i,j}) =$$

$$K_P[V_{SVG}^{pre}(t_{i,j}) - V_{SVG}^{set}(t_{i,0})] + K_I \Delta t \sum_{k3=0}^{i \times M+j} [V_{SVG}^{pre}(t_{i,j-k3}) - V_{SVG}^{set}(t_{i,-k3})] +$$

$$Q_{SVG}^{pre}(t_{0,0}) - K_P[V_{SVG}^{pre}(t_{0,0}) - V_{SVG}^{set}(t_{0,0})]$$

where $Q_{SVG}^{pre}(t_{i,j})$ represents the reactive power prediction value of the static var generator at the prediction time $t_{i,j}$, $Q_{SVG}^{ref}(t_{i,j-1})$ represents a reactive power reference value of the static var generator at a prediction time $t_{i,j-1}$, $Q_{SVG}^{pre}(t_{i,j-1})$ represents the reactive power prediction value of the static var generator at the prediction time $t_{i,j-1}$, $t_{i,j-1} = (Mi+j-1)\Delta t$, $T_d$ represents an action delay of the static var generator; $Q_{SVG}^{ref}(t_{i,j})$ represents the reactive power reference value of the static var generator at the prediction time $t_{i,j}$, $V_{SVG}^{pre}(t_{i,j-k3})$ represents the terminal voltage prediction value of the static var generator at a prediction time $t_{i,j-k3}$, $t_{i,j-k3} = (Mi+j-k3)\Delta t$, $V_{SVG}^{set}(t_{i,-k3})$ represents the terminal voltage setting value of the static var generator at a prediction time $t_{i,-k3}$, $t_{i,-k3} = (Mi-k3)\Delta t$, $Q_{SVG}^{pre}(t_{0,0})$ represents the reactive power prediction value of the static var generator at a current time $t_{0,0}$, $V_{SVG}^{pre}(t_{0,0})$ represents the terminal voltage prediction value of the static var generator at the current time $t_{0,0}$, $V_{SVG}^{set}(t_{0,0})$ represents the terminal voltage setting value of the static var generator at the current time $t_{0,0}$, $K_I$ represents a coefficient in a proportion calculation, $K_P$ represents a coefficient in an integral calculation.

7. The method according to claim 6, wherein the fourth constraint condition is denoted by formula (10):

$$V^{pre}(t_{i,j}) - V^{pre}(t_{0,0}) = S \begin{bmatrix} P_{WTG}^{pre}(t_{i,j}) - P_{WTG}^{pre}(t_{0,0}) \\ Q_{WTG}^{pre}(t_{i,j}) - Q_{WTG}^{pre}(t_{0,0}) \\ Q_{SVG}^{pre}(t_{i,j}) - Q_{SVG}^{pre}(t_{0,0}) \end{bmatrix} \quad (10)$$

where $V^{pre}(t_{i,j})$ represents a vector composing of the terminal voltage prediction values of the wind turbines, the terminal voltage prediction value of the static var generator and the voltage prediction value of the bus at the point of common coupling at the prediction time $t_{i,j}$, $V_{pre}(t_{0,0})$ represents the vector composing of the terminal voltage prediction values of the wind turbines, the terminal voltage prediction value of the static var generator and the voltage prediction value of the bus at the point of common coupling at the current time $t_{0,0}$, $P_{WTG}^{pre}(t_{0,0})$ represents the active power prediction values of the wind turbines at the current time $t_{0,0}$, $Q_{WTG}^{pre}(t_{0,0})$ represents the reactive power prediction values of the wind turbines at the current time $t_{0,0}$, S represents a sensitivity matrix and is determined by the automatic voltage control system.

8. The method according to claim 7, wherein the fifth constraint condition is denoted by formula (11):

$$\begin{cases} V^{min} \leq V^{pre}(t_{i,j}) \leq V^{max} \\ Q_{WTG}^{min} \leq Q_{WTG}^{pre}(t_{i,j}) \leq Q_{WTG}^{max} \\ Q_{SVG}^{min} \leq Q_{SVG}^{pre}(t_{i,j}) \leq Q_{SVG}^{max} \\ \Delta Q_{WTG}^{min} \leq Q_{SVG}^{pre}(t_{i,0}) - Q_{WTG}^{pre}(t_{i-1,0}) \leq \Delta Q_{WTG}^{max} \\ \Delta Q_{SVG}^{min} \leq Q_{SVG}^{pre}(t_{i,0}) - Q_{SVG}^{pre}(t_{i-1,0}) \leq \Delta Q_{SVG}^{max} \end{cases} \quad (11)$$

where $V^{max}$ and $V^{min}$ respectively represent upper limits and lower limits of the vector composing of the terminal voltage prediction values of the wind turbines, the terminal voltage prediction value of the static var generator and the voltage prediction value of the bus at the point of common coupling, $Q_{WTG}^{max}$ and $Q_{WTG}^{min}$ represent upper limits and lower limits of the reactive power prediction values of the wind turbines respectively, $Q_{SVG}^{max}$ and $Q_{SVG}^{min}$ represent an upper limit and a lower limit of the reactive power prediction value of the static var generator respectively, $Q_{WTG}^{pre}(t_{i-1,0})$ represents the reactive power prediction values of the wind turbines at the prediction time $t_{i-1,0}$, $\Delta Q_{WTG}^{max}$ and $\Delta Q_{WTG}^{min}$ represent upper limits and lower limits of reactive climbing speeds of the wind turbines respectively, $Q_{SVG}^{pre}(t_{i,0})$ represents the reactive power prediction value of the static var generator at the prediction time $t_{i,0}$, $Q_{SVG}^{pre}(t_{i-1,0})$ represents the reactive power prediction value of the static var generator at the prediction time $t_{i-1,0}$, and $\Delta Q_{SVG}^{max}$ and $\Delta Q_{SVG}^{min}$ represent an upper limit and a lower limit of a reactive climbing speed of the static var generator respectively.

9. An apparatus for controlling a voltage in a wind farm, wherein the apparatus is applied in a control of an automatic voltage control system in the wind farm and comprises:
a processor; and
a memory for storing instructions executable by the processor;
wherein the processor is configured to
collect measured values of parameters as initial values of prediction values of the parameters, wherein the prediction values comprise active power prediction values of wind turbines, reactive power prediction values of the wind turbines, terminal voltage prediction values of the wind turbines, a reactive power prediction value of a static var generator, a terminal voltage prediction value of the static var generator and a voltage prediction value of a bus at a point of common coupling;
input the initial values into a preset control model for optimizing a model predictive control, wherein the preset control model comprises an objective function and constraint conditions, the objective function is a function established according to the voltage prediction value of the bus at the point of common coupling, the reactive power prediction value of the static var generator and configured to optimize reactive power setting values of the wind turbines and a terminal voltage setting value of the static var generator, the constraint conditions comprise a first constraint condition of the active power prediction values of the wind turbines, a second constraint condition of the reactive power prediction values of the wind turbines, a third constraint condition of the reactive power prediction value of the static var generator, a fourth constraint condition of the terminal voltage prediction values of the wind turbines, the terminal voltage prediction value of the static var generator and the voltage prediction value of the bus at the point of common coupling and a fifth constraint condition of a system voltage, the reactive power prediction values of the wind turbines, and the reactive power prediction value of the static var generator;
solve the preset control model to obtain a first solution sequence of the reactive power setting values of the wind turbines and a second solution sequence of the terminal voltage setting value of the static var generator within a time window;
send first values in the first solution sequence to the wind turbines and a first value in the second solution sequence to the static var generator, such that a voltage control in the wind farm is realized.

10. The apparatus according to claim 9, wherein the processor is further configured to:
establish the preset control model.

11. The apparatus according to claim 10, wherein the processor is further configured to:
establish the objective function according to formula (1):

$$\min_{Q_{WTG}^{set}, V_{SVG}^{set}} \left( \sum_{i=0}^{N-1} \sum_{j=0}^{M-1} \rho^{t_{i,j}} F_1, \sum_{i=0}^{N-1} \sum_{j=0}^{M-1} \rho^{t_{i,j}} F_2 \right) \quad (1)$$

where $Q_{WTG}^{set}$ represents the reactive power setting values of the wind turbines, $V_{SVG}^{set}$ represents the terminal voltage setting value of the static var generator, N represents a number of control cycles in the time window, M represents a number of predicted points in a single control cycle, $\rho$ is an attenuation coefficient, $\rho<1$, $t_{i,j}=(Mi+j)\Delta t$ represents a prediction time corresponding to a $(j+1)^{th}$ predicted point in a $(i+1)^{th}$ control cycle, $\Delta t$ represents a time interval between prediction time corresponding to each two adjacent predicted points, $F_1$ represents a deviation between the voltage prediction value of the bus at the point of common coupling and a voltage reference value of the bus at the point of common coupling, $F_2$ represents a reactive power reserve of the static var generator, wherein $F_1$ is denoted by formula (2):

$$F_1(t_{i,j}) = [V_{PCC}^{pre}(t_{i,j}) - V_{PCC}^{ref}]^2 \qquad (2)$$

where $F_1(t_{i,j})$ represents a deviation between the voltage prediction value of the bus at the point of common coupling and a voltage reference value of the bus at the point of common coupling at the prediction time $t_{i,j}$, $V_{PCC}^{pre}(t_{i,j})$ represents the voltage prediction value of the bus at the point of common coupling at the prediction time $t_{i,j}$, $V_{PCC}^{ref}$ represents the voltage reference value of the bus at the point of common coupling;

$F_2$ is denoted by formula (3):

$$F_2(t_{i,j}) = [Q_{SVG}^{pre}(t_{i,j}) - Q_{SVG}^{opr}]^2 \qquad (3)$$

where $F_2(t_{i,j})$ represents a reactive power reserve of the static var generator at the prediction time $t_{i,j}$, $Q_{SVG}^{pre}(t_{i,j})$ represents the reactive power prediction value of the static var generator at the prediction time $t_{i,j}$, $Q_{SVG}^{opr}$ represents optimum reactive power of the static var generator;

simplifying the objective function according to formula (4) to obtain a simplified objective function, wherein the formula (4) is expressed as $$\min \sum_{i=0}^{N-1} \sum_{j=0}^{M-1} \rho^{t_{i,j}} F_3, \qquad (4)$$

where $F_3$ represents a deviation between the terminal voltage prediction value of the static var generator and terminal voltage setting value of the static var generator; $F_3$ is denoted by formula (5):

$$F_3(t_{i,j}) = [V_{SVG}^{pre}(t_{i,j}) - V_{SVG}^{set}(t_{i,0})]^2 \qquad (5)$$

where $F_3(t_{i,j})$ represents a deviation between the terminal voltage prediction value of the static var generator and terminal voltage setting value of the static var generator at the prediction time $t_{i,j}$, $V_{SVG}^{pre}(t_{i,j})$ represents the terminal voltage prediction value of the static var generator at the prediction time $t_{i,j}$, $V_{SVG}^{set}(t_{i,0})$ represents the terminal voltage setting value of the static var generator at a prediction time $t_{i,0}$, $t_{i,0}=(Mi)\Delta t$ represents a prediction time corresponding to a first predicted point in the $(i+1)^{th}$ control cycle;

the simplified objective function is denoted by formula (6):

$$\min \sum_{i=0}^{N-1} \sum_{j=0}^{M-1} \rho^{t_{i,j}} (F_1 + \alpha F_2 + \beta F_3) \qquad (6)$$

where $\alpha$ and $\beta$ represent weights corresponding respectively to $F_2$ and $F_3$.

12. The apparatus according to claim 11, wherein the first constraint condition is denoted by formula (7):

$$P_{WTG}^{pre}(t_{i,j}) = \sum_{k1=1}^{N_a} \phi_{k1} P_{WTG}^{pre}(t_{i,j-k1}) + \varepsilon_{WTG}^{pre}(t_{i,j}) - \sum_{k2=1}^{N_m} \theta_{k2} \varepsilon_{WTG}^{pre}(t_{i,j-k2}) \qquad (7)$$

where $P_{WTG}^{pre}(t_{i,j})$ represents the active power prediction values of the wind turbines at the prediction time $t_{i,j}$, $\varepsilon_{WTG}^{pre}(t_{i,j})$ represents errors of the active power prediction values of the wind turbines at the prediction time $t_{i,j}$, $P_{WTG}^{pre}(t_{i,j-k1})$ represents the active power prediction values of the wind turbines at a prediction time $t_{i,j-k1}$, $t_{i,j-k1}=(Mi+j-k1)\Delta t$, $\varepsilon_{WTG}^{pre}(t_{i,j-k2})$ represents the errors of the active power prediction values of the wind turbines at a prediction time $t_{i,j-k2}$, $t_{i,j-k2}=(Mi+j-k2)\Delta t$, if $t_{i,j-k1} \leq 0$, the active power prediction values of the wind turbines are historical values at a corresponding time, $N_a$ represents an order number of an auto regression model, $N_m$ represents an order number of a moving average model, $\varphi_{k1}$ and $\theta_{k2}$ represent relative weights corresponding respectively to the $P_{WTG}^{pre}(t_{i,j-k1})$ and $\varepsilon_{WTG}^{pre}(t_{i,j-k2})$.

13. The apparatus according to claim 12, wherein the second constraint condition is denoted by formula (8):

$$Q_{WTG}^{pre}(t_{i,j}) = \qquad (8)$$

$$\frac{1 - e^{-(t_{i,j}-t_{i,0})/T_s}}{1 - e^{-M\Delta t/T_s}} Q_{WTG}^{set}(t_{i,0}) + \frac{e^{-(t_{i,j}-t_{i,0})/T_s} - e^{-M\Delta t/T_s}}{1 - e^{-M\Delta t/T_s}} Q_{WTG}^{pre}(t_{i,0})$$

$$Q_{WTG}^{pre}(t_{i,0}) = Q_{WTG}^{set}(t_{i-1,0})$$

where $Q_{WTG}^{pre}(t_{i,j})$ is a component of $Q_{WTG}^{pre}(t_{i,j})$ and represents a reactive power prediction value of a wind turbine at the prediction time $t_{i,j}$, $Q_{WTG}^{pre}(t_{i,j})$ represents the reactive power prediction values of the wind turbines at the prediction time $t_{i,j}$, $Q_{WTG}^{set}(t_{i,0})$ is a component of $Q_{WTG}^{set}(t_{i,0})$ and represents a reactive power setting value of the wind turbine at the prediction time $t_{i,0}$, $Q_{WTG}^{set}(t_{i,0})$ represents the reactive power setting values of the wind turbines at the prediction time $t_{i,0}$, $Q_{WTG}^{pre}(t_{i,0})$ is a component of $Q_{WTG}^{pre}(t_{i,0})$ and represents a reactive power prediction value of the wind turbine at the prediction time $t_{i,0}$, $Q_{WTG}^{set}(t_{i-1,0})$ is a component of $Q_{WTG}^{set}(t_{i-1,0})$ and represents a reactive power setting value of the wind turbine at a prediction time $t_{i-1,0}$, $Q_{WTG}^{pre}(t_{i,0})$ represents the reactive power prediction values of the wind turbines at the prediction time $t_{i,0}$, $Q_{WTG}^{set}(t_{i-1,0})$ represents the reactive power setting values of the wind turbines at the prediction time $t_{i-1,0}$, $t_{i-1,0}=(M(i-1))\Delta t$ represents a prediction time corresponding to a first predicted point in a $i^{th}$ control cycle, $T_s$ represents a time constant of adjusting the reactive powers of the wind turbines.

14. The apparatus according to claim 13, wherein the third constraint condition is denoted by formula (9):

$$Q_{SVG}^{pre}(t_{i,j}) = Q_{SVG}^{ref}(t_{i,j-1}) + [Q_{SVG}^{pre}(t_{i,j-1}) - Q_{SVG}^{ref}(t_{i,j-1})]e^{-(t_{i,j}-t_{i,j-1})/T_d} \qquad (9)$$

$$Q_{SVG}^{ref}(t_{i,j}) =$$

$$K_P[V_{SVG}^{pre}(t_{i,j}) - V_{SVG}^{set}(t_{i,0})] + K_I \Delta t \sum_{k3=0}^{i \times M + j} [V_{SVG}^{pre}(t_{i,j-k3}) - V_{SVG}^{set}(t_{i,-k3})] +$$

$$Q_{SVG}^{pre}(t_{0,0}) - K_P[V_{SVG}^{pre}(t_{0,0}) - V_{SVG}^{set}(t_{0,0})]$$

where $Q_{SVG}^{pre}(t_{i,j})$ represents the reactive power prediction value of the static var generator at the prediction time $t_{i,j}$, $Q_{SVG}^{ref}(t_{i,j-1})$ represents a reactive power reference value of the static var generator at a prediction time $t_{i,j-1}$, $Q_{SVG}^{pre}(t_{i,j-1})$ represents the reactive power prediction value of the static var generator at the prediction time $t_{i,j-1}$, $t_{i,j-1}=(Mi+j-1)\Delta t$, $T_d$ represents an action delay of the static var generator; $Q_{SVG}^{ref}(t_{i,j})$ represents the reactive power reference value of the static var generator at the prediction time $t_{i,j}$, $V_{SVG}^{pre}(t_{i,j-k3})$ represents the terminal voltage prediction value of the static var generator at a prediction time $t_{i,j-k3}$, $t_{i,j-k3}=(Mi+j-k3)\Delta t$, $V_{SVG}^{set}(t_{i,-k3})$ represents the terminal voltage setting value of the static var generator at a prediction time $t_{i,-k3}$, $t_{i,-k3}=(Mi-k3)\Delta t$, $Q_{SVG}^{pre}(t_{0,0})$ represents the reactive power prediction value of the static var generator at a current time $t_{0,0}$, $V_{SVG}^{pre}(t_{0,0})$ represents the terminal voltage prediction value of the static var generator at the current time $t_{0,0}$, $V_{SVG}^{set}(t_{0,0})$ represents the terminal voltage setting value of the static var generator at the current time $t_{0,0}$, $K_I$ represents a coefficient in a proportion calculation, $K_P$ represents a coefficient in an integral calculation.

15. The apparatus according to claim 14, wherein the fourth constraint condition is denoted by formula (10):

$$V^{pre}(t_{i,j}) - V^{pre}(t_{0,0}) = S \begin{bmatrix} P_{WTG}^{pre}(t_{i,j}) - P_{WTG}^{pre}(t_{0,0}) \\ Q_{WTG}^{pre}(t_{i,j}) - Q_{WTG}^{pre}(t_{0,0}) \\ Q_{SVG}^{pre}(t_{i,j}) - Q_{SVG}^{pre}(t_{0,0}) \end{bmatrix} \quad (10)$$

where $V^{pre}(t_{i,j})$ represents a vector composing of the terminal voltage prediction values of the wind turbines, the terminal voltage prediction value of the static var generator and the voltage prediction value of the bus at the point of common coupling at the prediction time $t_{i,j}$, $V_{pre}(t_{0,0})$ represents the vector composing of the terminal voltage prediction values of the wind turbines, the terminal voltage prediction value of the static var generator and the voltage prediction value of the bus at the point of common coupling at the current time $t_{0,0}$, $P_{WTG}^{pre}(t_{0,0})$ represents the active power prediction values of the wind turbines at the current time $t_{0,0}$, $Q_{WTG}^{pre}(t_{0,0})$ represents the reactive power prediction values of the wind turbines at the current time $t_{0,0}$, S represents a sensitivity matrix and is determined by the automatic voltage control system.

16. The apparatus according to claim 15, the fifth constraint condition is denoted by formula (11):

$$\begin{cases} V^{min} \leq V^{pre}(t_{i,j}) \leq V^{max} \\ Q_{WTG}^{min} \leq Q_{WTG}^{pre}(t_{i,j}) \leq Q_{WTG}^{max} \\ Q_{SVG}^{min} \leq Q_{SVG}^{pre}(t_{i,j}) \leq Q_{SVG}^{max} \\ \Delta Q_{WTG}^{min} \leq Q_{WTG}^{pre}(t_{i,0}) - Q_{WTG}^{pre}(t_{i-1,0}) \leq Q_{WTG}^{max} \\ \Delta Q_{SVG}^{min} \leq Q_{SVG}^{pre}(t_{i,0}) - Q_{SVG}^{pre}(t_{i-1,0}) \leq \Delta Q_{SVG}^{max} \end{cases} \quad (11)$$

where $V^{max}$ and $V^{min}$ respectively represent upper limits and lower limits of the vector composing of the terminal voltage prediction values of the wind turbines, the terminal voltage prediction value of the static var generator and the voltage prediction value of the bus at the point of common coupling, $Q_{WTG}^{max}$ and $Q_{WTG}^{min}$ represent upper limits and lower limits of the reactive power prediction values of the wind turbines respectively, $Q_{SVG}^{max}$ and $Q_{SVG}^{min}$ represent an upper limit and a lower limit of the reactive power prediction value of the static var generator respectively, $Q_{WTG}^{pre}(t_{i-1,0})$ represents the reactive power prediction values of the wind turbines at the prediction time $t_{i-1,0}$, $\Delta Q_{WTG}^{max}$ and $\Delta Q_{WTG}^{min}$ represent upper limits and lower limits of reactive climbing speeds of the wind turbines respectively, $Q_{SVG}^{pre}(t_{i,0})$ represents the reactive power prediction value of the static var generator at the prediction time $t_{i,0}$, $Q_{SVG}^{pre}(t_{i-1,0})$ represents the reactive power prediction value of the static var generator at the prediction time $t_{i-1,0}$, and $\Delta Q_{SVG}^{max}$ and $\Delta Q_{SVG}^{min}$ represent an upper limit and a lower limit of a reactive climbing speed of the static var generator respectively.

17. A non-transitory computer-readable storage medium having stored therein instructions that, when executed by a processor of a computer, causes the computer to perform a method for controlling a voltage in a wind farm, the method comprising:
collecting measured values of parameters as initial values of prediction values of the parameters, wherein the prediction values comprise active power prediction values of wind turbines, reactive power prediction values of the wind turbines, terminal voltage prediction values of the wind turbines, a reactive power prediction value of a static var generator, a terminal voltage prediction value of the static var generator and a voltage prediction value of a bus at a point of common coupling;
inputting the initial values into a preset control model for optimizing a model predictive control, wherein the preset control model comprises an objective function and constraint conditions, the objective function is a function established according to the voltage prediction value of the bus at the point of common coupling and the reactive power prediction value of the static var generator, and configured to optimize reactive power setting values of the wind turbines and a terminal voltage setting value of the static var generator, the constraint conditions comprise a first constraint condition of the active power prediction values of the wind turbines, a second constraint condition of the reactive power prediction values of the wind turbines, a third constraint condition of the reactive power prediction value of the static var generator, a fourth constraint condition of the terminal voltage prediction values of the wind turbines, the terminal voltage prediction value of the static var generator and the voltage prediction value of the bus at the point of common coupling and a fifth constraint condition of a system voltage, the reactive power prediction values of the wind turbines, and the reactive power prediction value of the static var generator;
solving the preset control model to obtain a first solution sequence of the reactive power setting values of the wind turbines and a second solution sequence of the terminal voltage setting value of the static var generator within a time window;
sending first values in the first solution sequence to the wind turbines and a first value in the second solution sequence to the static var generator, such that a voltage control in the wind farm is realized.

* * * * *